US012752289B2

(12) United States Patent
Lai

(10) Patent No.: US 12,752,289 B2
(45) Date of Patent: Oct. 6, 2026

(54) SPRAY GUN SHOWER

(71) Applicant: Xiamen Jaslen Sanitary Ware Co., Ltd, Xiamen (CN)

(72) Inventor: Huiming Lai, Xiamen (CN)

(73) Assignee: Xiamen Jaslen Sanitary Ware Co., Ltd, Xiamen (CN)

(*) Notice: Subject to any disclaimer, the term of this patent is extended or adjusted under 35 U.S.C. 154(b) by 266 days.

(21) Appl. No.: 18/236,954

(22) Filed: Sep. 20, 2023

(65) Prior Publication Data

US 2024/0399391 A1 Dec. 5, 2024

(30) Foreign Application Priority Data

Jun. 2, 2023 (CN) ......................... 202321398933.1
Aug. 1, 2023 (CN) ......................... 202322043931.7

(51) Int. Cl.
*B05B 1/16* (2006.01)

(52) U.S. Cl.
CPC ............ *B05B 1/169* (2013.01); *B05B 1/1609* (2013.01)

(58) Field of Classification Search
CPC ..... B05B 1/1609; B05B 1/1681; B05B 1/169; B05B 1/16; B05B 1/18; B05B 1/1627; B05B 1/207; B05B 1/304; B05B 1/3026; B05B 11/0067; B05B 12/002; B05B 12/0022; B05B 12/0024; B05B 12/0026; E03C 1/08
See application file for complete search history.

(56) References Cited

U.S. PATENT DOCUMENTS

2013/0239320 A1* 9/2013 Aihara .................... B05B 1/169 4/615
2013/0327431 A1* 12/2013 Zhou ..................... B05B 1/1609 137/861
2014/0054391 A1* 2/2014 Schroeder .............. B05B 1/185 239/444
2023/0407975 A1* 12/2023 Strmsek ................. F16K 31/44

FOREIGN PATENT DOCUMENTS

CN 1651152 A * 8/2005 ........... B05B 1/1609

* cited by examiner

*Primary Examiner* — Gerald L Sung
*Assistant Examiner* — Jingchen Liu
(74) *Attorney, Agent, or Firm* — Bayramoglu Law Offices LLC

(57) ABSTRACT

A spray gun shower includes a shower body, a plurality of shower valve cores, a spray gun valve core, a limiting member, and a reset elastic member. The limiting member is arranged in the shower body and movable between a limiting position and an avoidance position. The limiting member is configured to be in limiting fit with a limiting portion on the shower valve core when located at the limiting position, and the limiting member is configured to avoid the limiting portion on the shower valve core when located at the avoidance position. When the shower valve core is driven, a pushing portion on the shower valve core drives the limiting member to move from the limiting position to the avoidance position.

8 Claims, 13 Drawing Sheets

SPRAY GUN SHOWER

CROSS REFERENCE TO THE RELATED APPLICATIONS

This application is based upon and claims priority to Chinese Patent Application No. 202321398933.1, filed on Jun. 2, 2023; and Chinese Patent Application No. 202322043931.7, filed on Aug. 1, 2023, the entire contents of which are incorporated herein by reference.

TECHNICAL FIELD

The present disclosure relates to a spray gun shower.

BACKGROUND

Currently on the market, the water flow from showers is designed in various forms, such as granular water, massage water, and sheet-shaped water. The showers are generally internally provided with a switching structure, which is driven by turning a knob, pressing a button or pushing a push button, etc., so as to switch between various water outflow forms by the switching structure. In terms of driving the switching structure by buttons, the number of the buttons usually corresponds to the number of water outflow forms. Specifically, different water sprays are available by pressing different buttons. In the prior art, when buttons are used to drive the switching structure, a transmission member is generally arranged between the button and the switching structure, so that a linkage is formed among the buttons. When one of the buttons is pressed, the remaining buttons are automatically reset by the transmission members. In this way, although the linkage between the buttons can be achieved, the structure is relatively complicated. As the number of buttons and the number of water outlets increase, more transmission members are also required, thereby making the structure more complicated. In addition, in the prior art, although there is also a reset button for controlling all water outlets on the water outlet panel of a shower to stop water outflow, the reset button is generally configured only to reset, which occupies a space on the shower body of the shower.

SUMMARY

An objective of the present disclosure is to provide a spray gun shower, which has a simpler and more compact structure by press switching between water outflow from a plurality of shower water outlets, and uses a spray gun valve core as a reset member. Therefore, when the spray gun valve core is pressed, the shower water outlets all stop water outflow, and a spray gun water outlet is controlled for water outflow, thereby achieving better use experience without separately arranging a “reset button”.

In order to achieve the above objective, the present disclosure adopts the following technical solutions:

A spray gun shower includes:

- a shower body provided with a water inlet channel, a plurality of shower water channels, a spray gun water channel, a plurality of shower water outlets in one-to-one communication with the shower water channels, and a spray gun water outlet in communication with the spray gun water channel;
- a plurality of shower valve cores movably arranged on the shower body, where each shower valve core is configured to control the connection or disconnection between the water inlet channel and the corresponding shower water channel, and each shower valve core is provided with a limiting portion;
- a spray gun valve core movably arranged on the shower body, where the spray gun valve core is configured to control the connection or disconnection between the water inlet channel and the spray gun water channel;
- a limiting member arranged in the shower body and movable between a limiting position and an avoidance position, where the limiting member is configured to be in limiting fit with the limiting portion on the shower valve core when located at the limiting position, the limiting member is configured to avoid the limiting portion on the shower valve core when located at the avoidance position, and the shower valve core and the spray gun valve core each are provided with a pushing portion configured to push the limiting member to move from the limiting position to the avoidance position; and
- a reset elastic member arranged in the shower body and configured to apply an elastic force on the limiting member to move from the avoidance position to the limiting position, where
- when the shower valve core is driven, the pushing portion on the shower valve core drives the limiting member to move from the limiting position to the avoidance position, and after the pushing portion on the shower valve core moves beyond the limiting member, the limiting member is reset to the limiting position under the action of the reset elastic member, and then is in limiting fit with the limiting portion on the shower valve core, so that the shower valve core is limited at a position at which the corresponding shower water channel communicates with the water inlet channel; and when the spray gun valve core is driven, the water inlet channel communicates with the spray gun water channel, and the pushing portion on the spray gun valve core drives the limiting member to move from the limiting position to the avoidance position.

In a preferred embodiment, the limiting member is a limiting plate, the limiting plate is slidably arranged in the shower body, and the limiting plate is provided with a plurality of through holes; the shower valve cores and the spray gun valve core each have a shaft-shaped structure; each of the shower valve cores and the spray gun valve core are slidably arranged on the shower body in an axial direction of the through hole, and protrusions are provided on peripheral walls of the shower valve core and the spray gun valve core; the protrusions each are provided with an abutting surface for forming the pushing portion, the abutting surface matches an inner wall of the through hole, and at least one of the abutting surface and the inner wall of the through hole is an inclined surface; the protrusion of the shower valve core is further provided with a limiting step for forming the limiting portion; after the abutting surface of the protrusion of the shower valve core moves beyond the through hole, the limiting member is reset from the avoidance position to the limiting position, and the limiting step is clamped at an edge of the through hole.

In a preferred embodiment, the limiting member is arranged in the water inlet channel, and a plurality of shower valve ports and a spray gun valve port are provided in the shower body; the water inlet channel communicates with the corresponding shower water channel through each shower valve port, and the water inlet channel communicates with the spray gun water channel through the spray gun valve port; the shower valve core slidably penetrates the shower valve port to open or close the shower valve port, and the spray gun valve core slidably penetrates the spray gun valve port to open or close the spray gun valve port.

In a preferred embodiment, inner ends of the shower valve cores are provided with the protrusions, and outer ends of the shower valve core and the spray gun valve core hermetically penetrate out of the shower body.

In a preferred embodiment, the shower body is provided with a first punched hole for the shower valve core to pass through and a second punched hole for the spray gun valve core to pass through; the shower valve core is provided with a first sealing member for sealing the shower valve port and a second sealing member for sealing the first punched hole; and the spray gun valve core is provided with a third sealing member for sealing the spray gun valve port and a fourth sealing member for sealing the second punched hole.

In a preferred embodiment, the shower body includes a shower head and a handle, the limiting member is arranged in the handle and slides in an axial direction of the handle, the plurality of shower valve cores are arranged on the handle side by side in the axial direction of the handle, and the shower valve cores are spaced.

In a preferred embodiment, the shower valve core and the spray gun valve core each have a shaft-shaped structure, and the shower valve core and the spray gun valve core are slidably arranged on the shower body in a radial direction of the handle.

In a preferred embodiment, the spray gun shower further includes a spray gun button and a plurality of shower buttons movably arranged on the handle, where the spray gun button is in linkage fit with the spray gun valve core, and the shower buttons are in one-to-one linkage fit with the shower valve cores; the shower head includes a water outlet panel provided with the shower water outlets, the shower buttons and the water outlet panel are on the same side of the shower body, the spray gun button and the water outlet panel are on different sides of the shower body, and a direction in which the spray gun button is pressed is opposite to a direction in which the shower buttons are pressed.

In a preferred embodiment, the reset elastic member is a compression spring, one end of the compression spring abuts against an inner wall of the shower body, and the other end of the compression spring abuts against an end of the limiting member.

In a preferred embodiment, the shower body is internally further provided with a shower valve core reset member and a spray gun valve core reset member; when the limiting member releases a limitation on the shower valve core, the shower valve core reset member drives the shower valve core to reset; and after an external force applied to the spray gun valve core is removed, the spray gun valve core is reset under the action of the spray gun valve core reset member.

Compared with the prior art, the present disclosure has the following beneficial effects:

In the technical solutions of the present disclosure, a spray gun shower, including a shower body, a plurality of shower valve cores, a spray gun valve core, a limiting member and a reset elastic member are arranged. The limiting member is arranged in the shower body and movable between a limiting position and an avoidance position. The limiting member is configured to be in limiting fit with a limiting portion on the shower valve core when located at the limiting position, and the limiting member is configured to avoid the limiting portion on the shower valve core when located at the avoidance position. When the shower valve core is driven, a pushing portion on the shower valve core drives the limiting member to move from the limiting position to the avoidance position, and after the pushing portion on the shower valve core moves beyond the limiting member, the limiting member is reset to the limiting position under the action of the reset elastic member, and then is in limiting fit with the limiting portion on the shower valve core, so that the shower valve core is limited at a position at which a corresponding shower water channel communicates with a water inlet channel, to achieve water outflow from shower water outlets. When the spray gun valve core is driven, the water inlet channel communicates with a spray gun water channel to achieve water outflow from a spray gun water outlet, and a pushing portion on the spray gun valve core drives the limiting member to move from the limiting position to the avoidance position to stop the water outflow from all the shower water outlets. With the above solutions, on one hand, the structure is simpler and more compact on the basis of achieving press switching between water outflow from the plurality of shower water outlets; on the other hand, the spray gun valve core used as a reset member cannot be limited by the limiting member, so that when the spray gun valve core is pressed, the shower water outlets all stop water outflow, and the spray gun water outlet is controlled for water outflow; and after an external force applied to the spray gun valve core is removed, the spray gun valve core controls stop of outflow of spray gun water. This skillfully combines the water outlet method of "making water flow out whenever pressing and making no water flow out in the case of no pressing" during use of the spray gun water and the function of the "reset button" in the prior art, so that the use experience is better without separately arranging the "reset button", and the structure is simpler and more compact.

BRIEF DESCRIPTION OF THE DRAWINGS

In order to make the advantages of the present disclosure easier to understand, the present disclosure briefly described above will be described in more detail with reference to specific implementations shown in accompanying drawings. It can be understood that these accompanying drawings only describe typical implementations of the present disclosure, so the accompanying drawings should not be considered as limiting the protection scope of the present disclosure. The present disclosure is described and explained with additional characteristics and details by means of the accompanying drawings. In the accompanying drawings.

Figure 1:
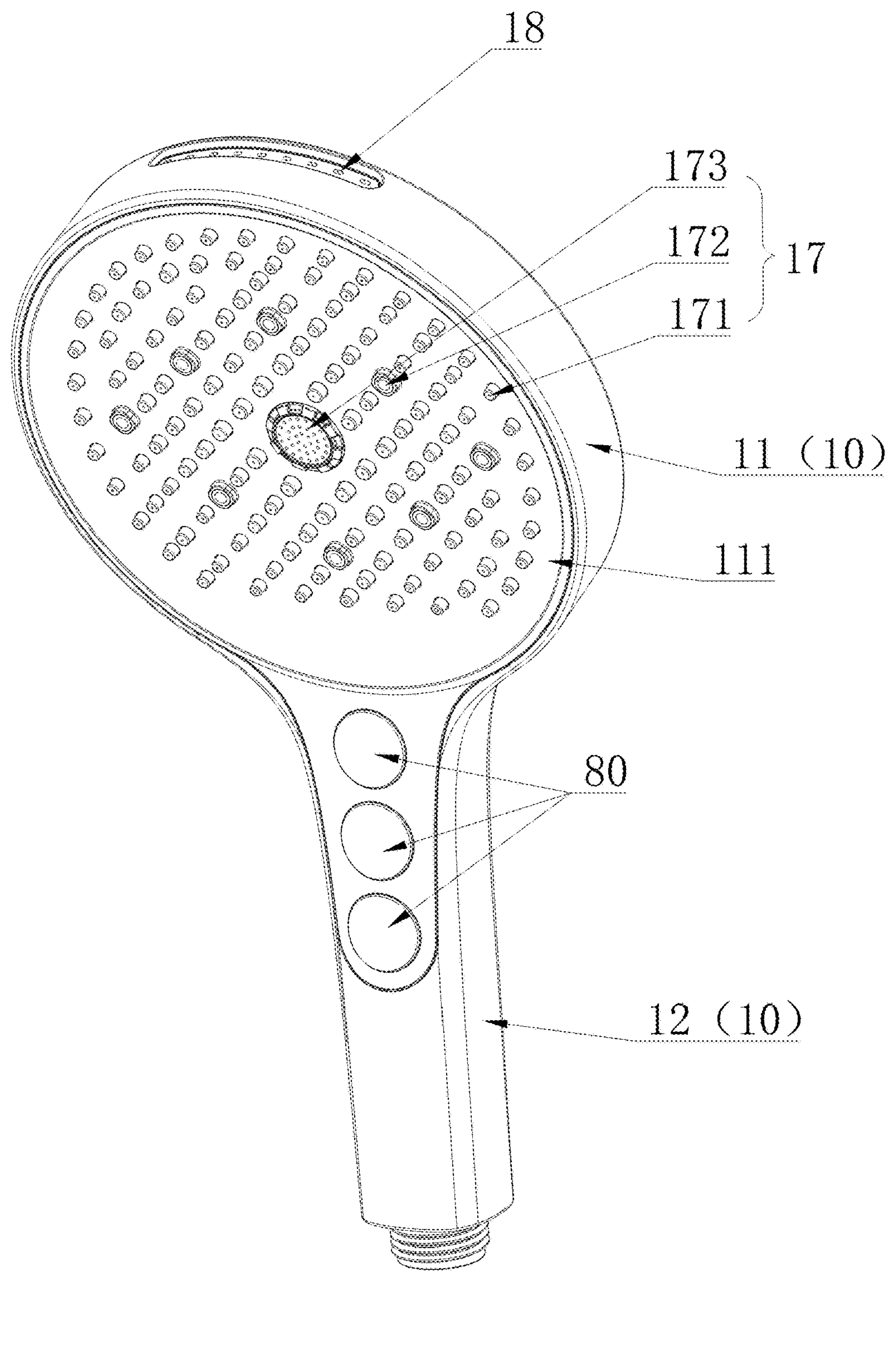
FIG. 1 is a perspective assembly view of a spray gun shower according to an embodiment of the present disclosure.
Figure 2:
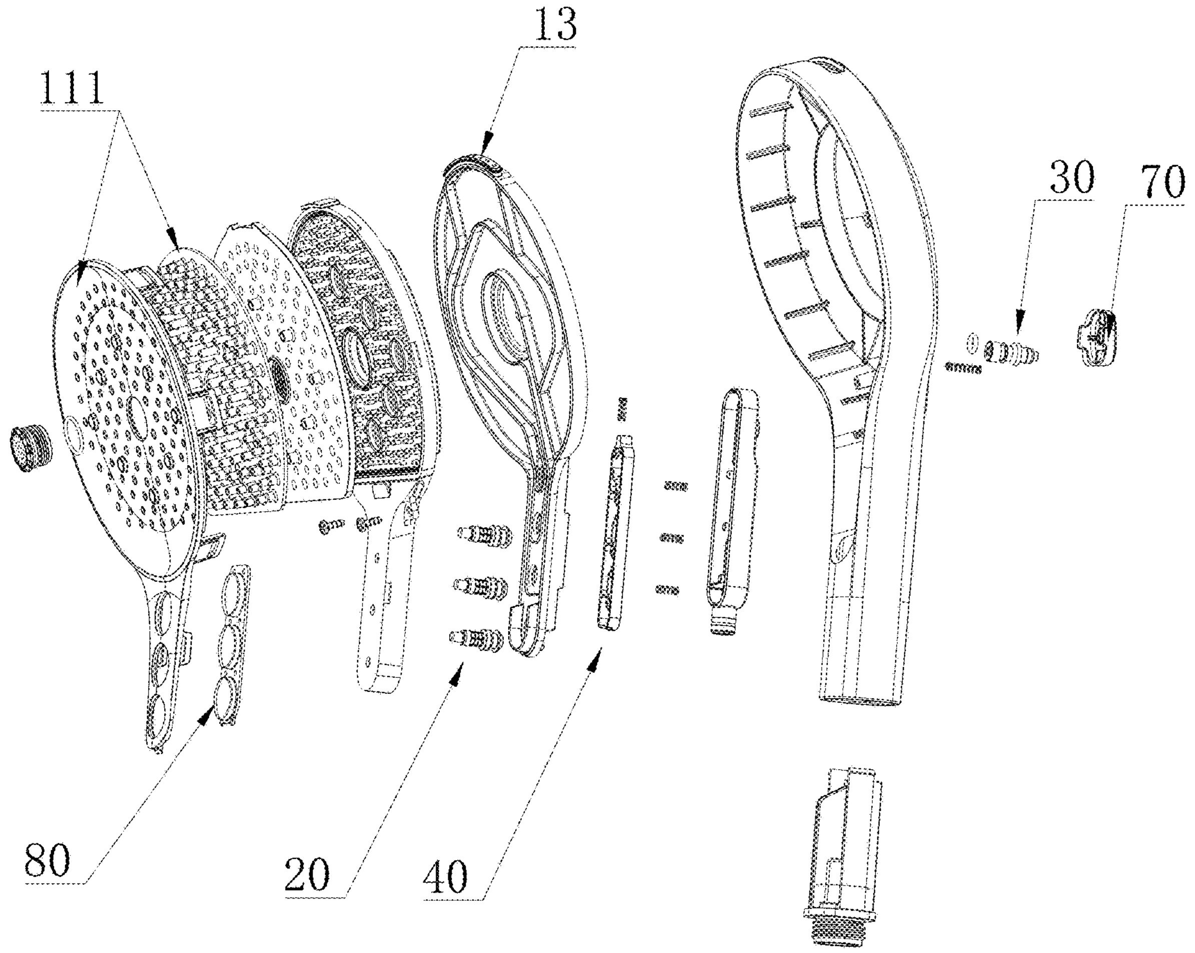
FIG. 2 is a perspective exploded view of a spray gun shower according to an embodiment of the present disclosure.
Figure 3:
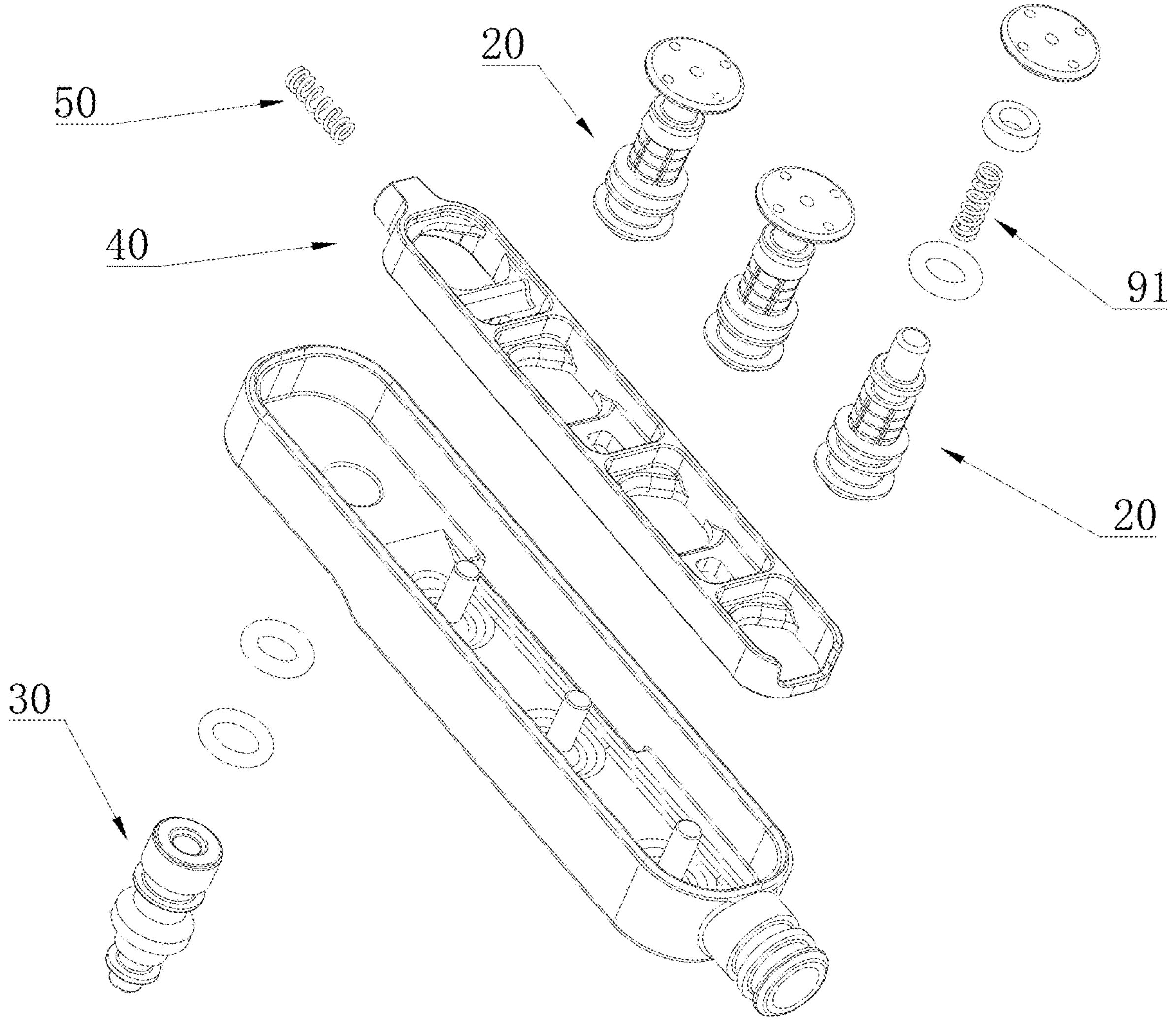
FIG. 3 is a first partial exploded view of a spray gun shower according to an embodiment of the present disclosure.
Figure 4:
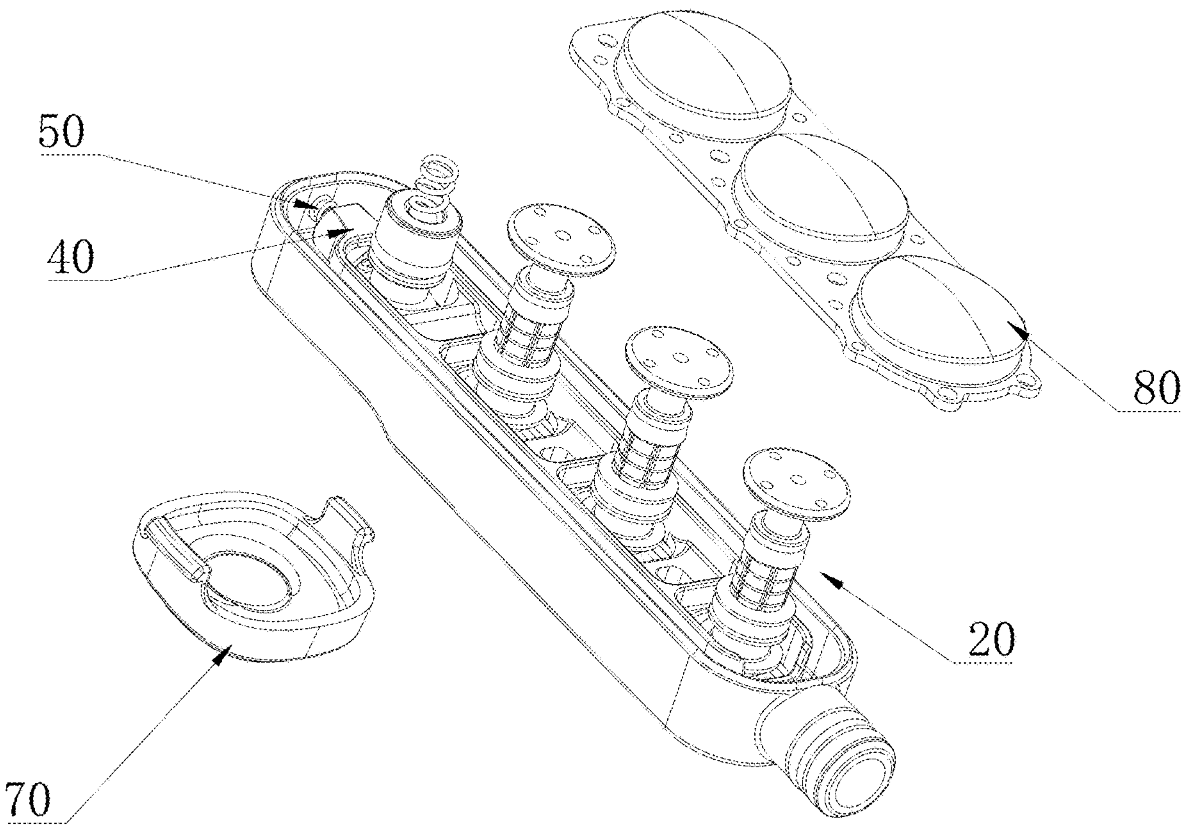
FIG. 4 is a second partial exploded view of a spray gun shower according to an embodiment of the present disclosure.
Figure 5:
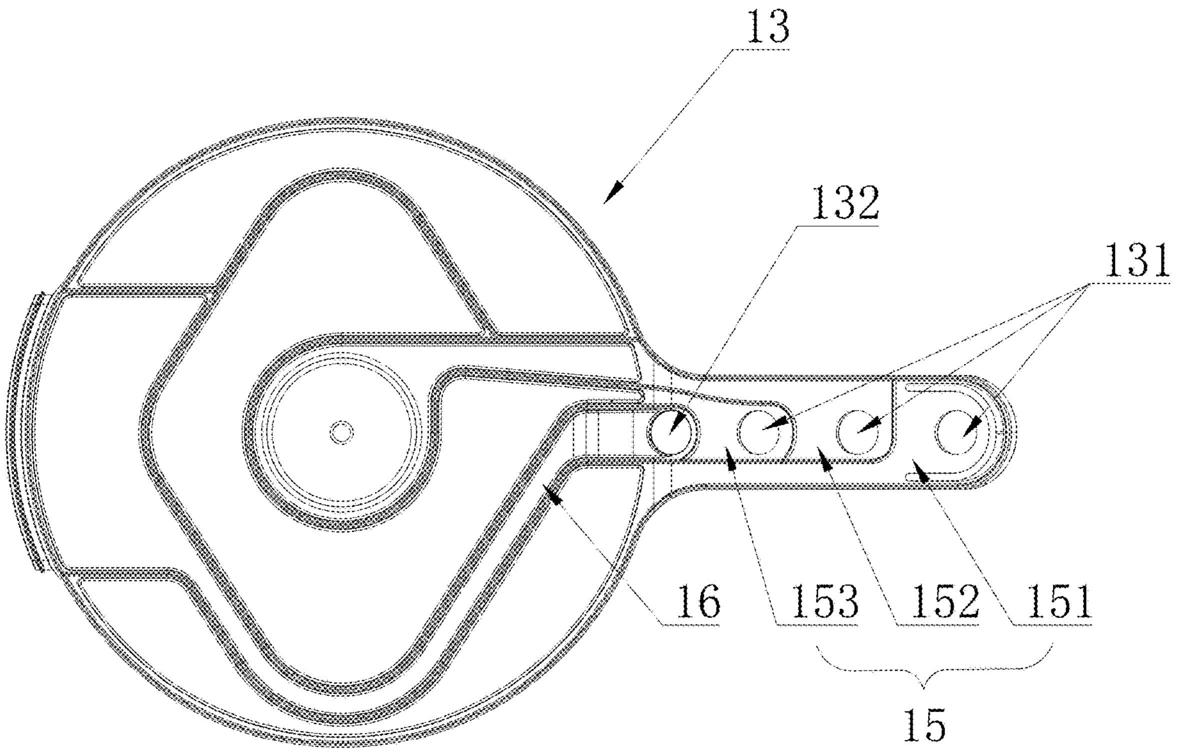
FIG. 5 is a schematic front view of a water distribution disc according to an embodiment of the present disclosure.
Figure 6:
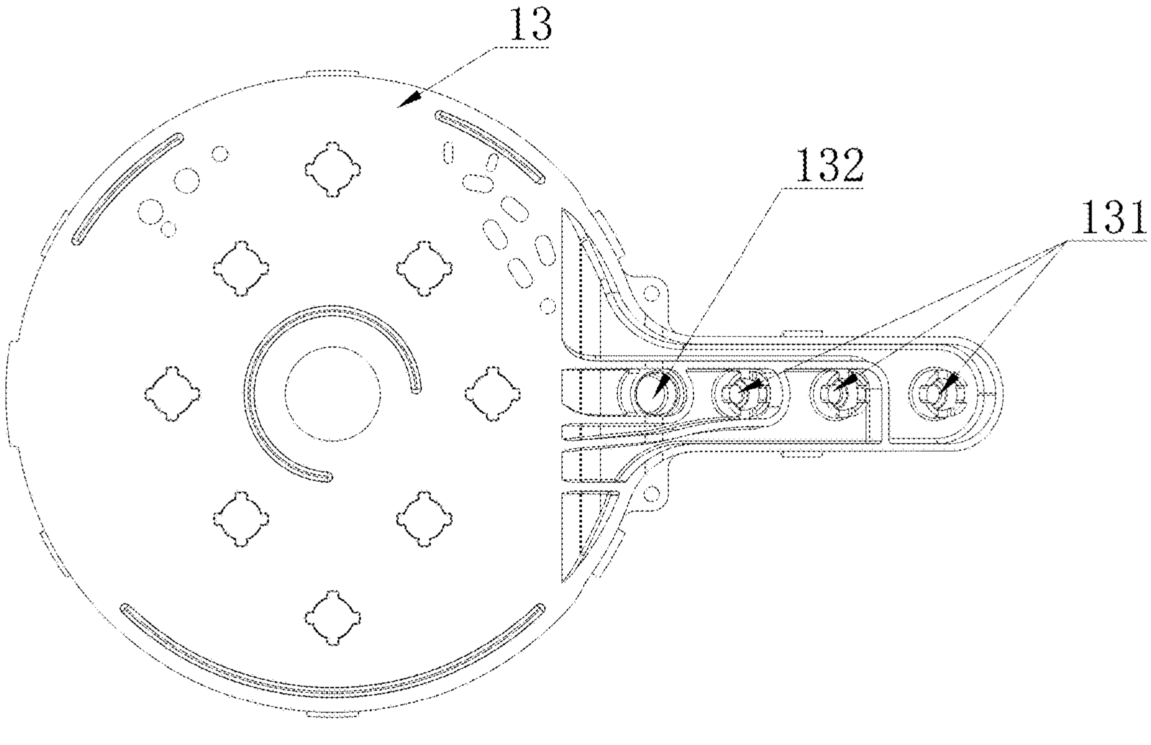
FIG. 6 is a schematic rear view of a water distribution disc according to an embodiment of the present disclosure.
Figure 7:
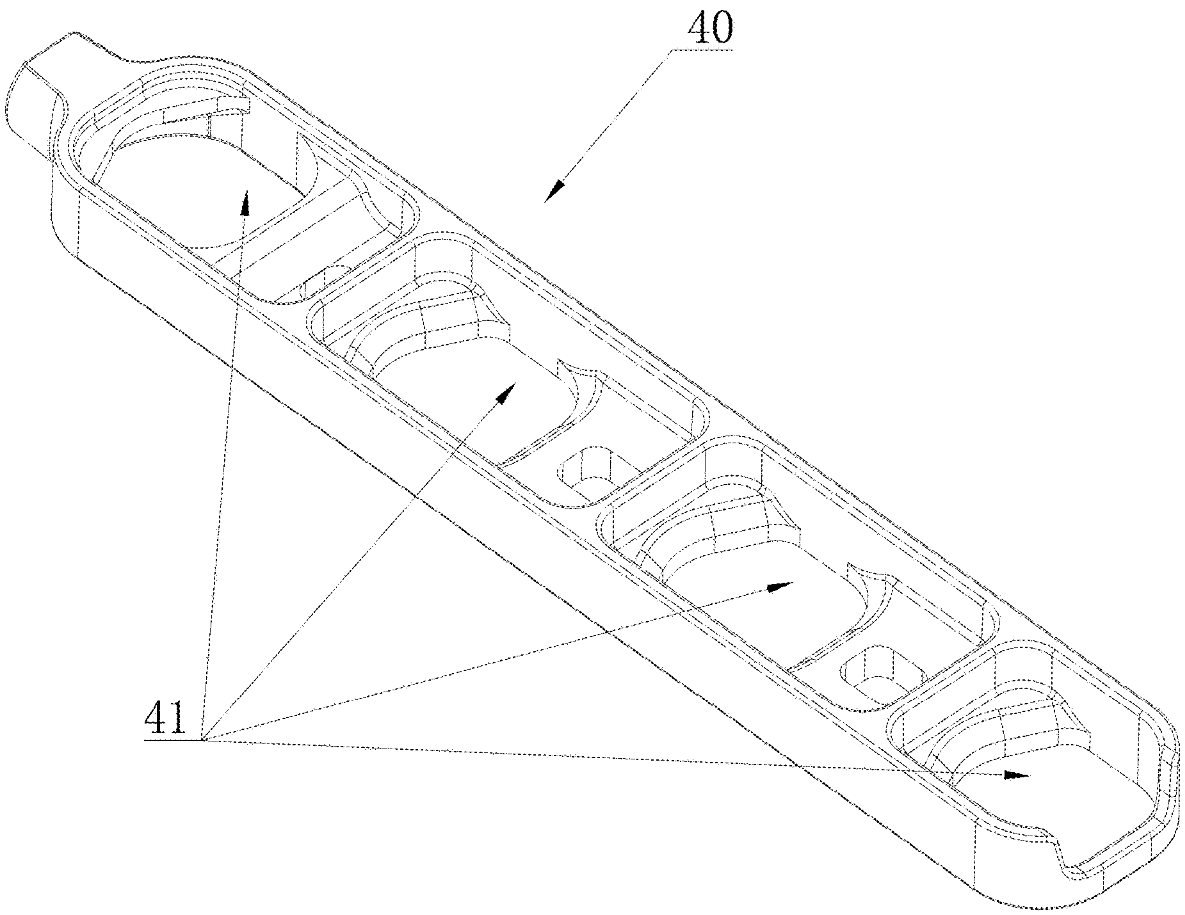
FIG. 7 is a perspective structural diagram of a limiting member according to an embodiment of the present disclosure.
Figure 8:
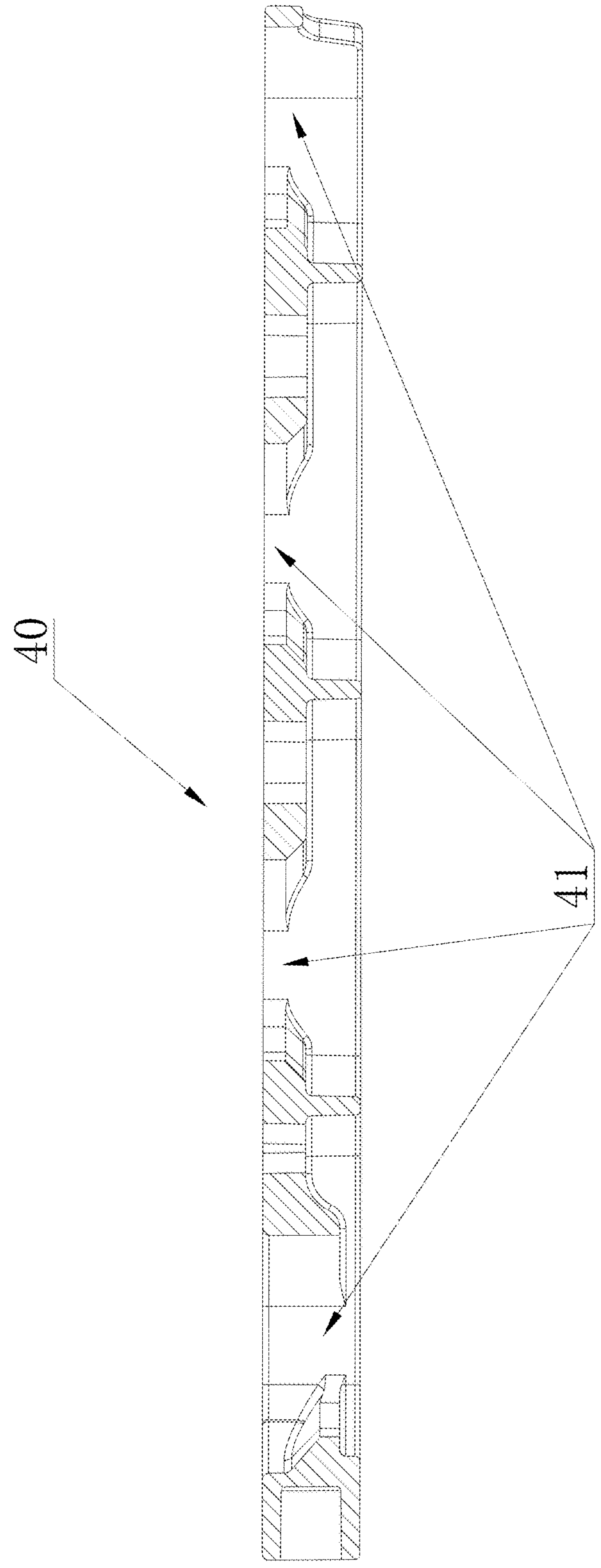
FIG. 8 is a sectional view of a limiting member according to an embodiment of the present disclosure.
Figure 9:
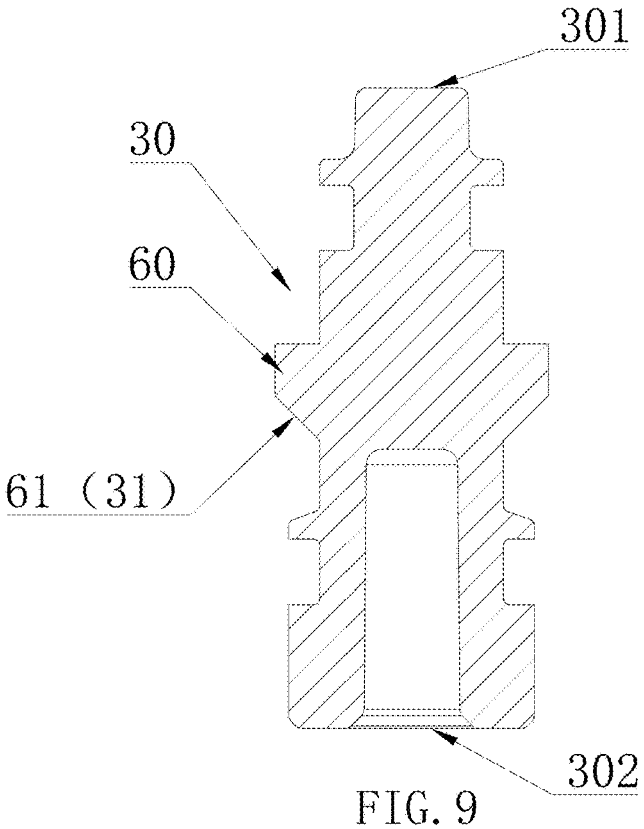
FIG. 9 is a sectional view of a spray gun valve core according to an embodiment of the present disclosure.
Figure 10:
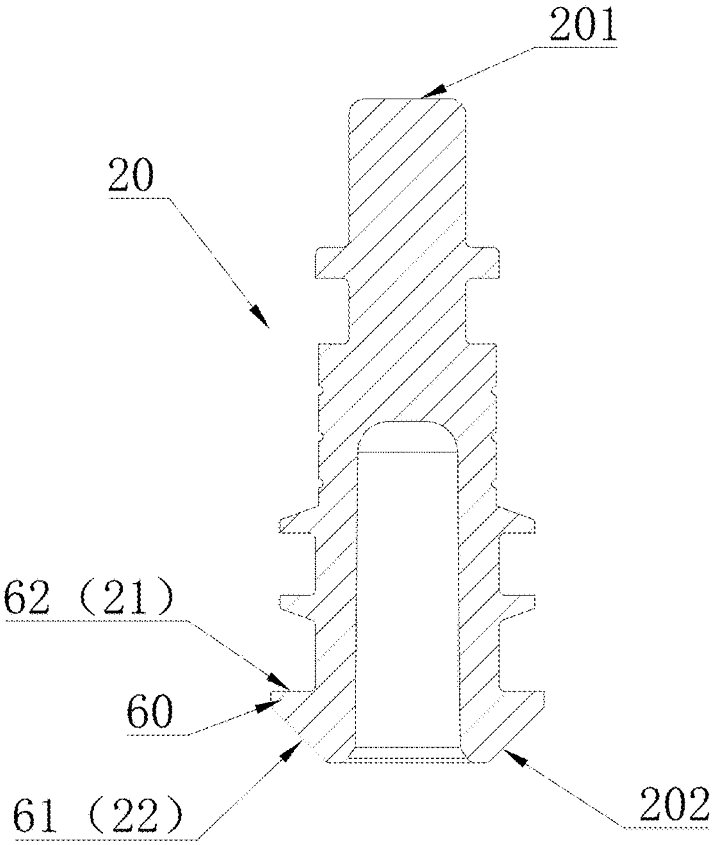
FIG. 10 is a sectional view of a shower valve core according to an embodiment of the present disclosure.

Reference numerals in the figures are as follows:

10—Shower body; 11—Shower head; 111—Water outlet panel; 12—handle; 121—First punched hole; 122—Second punched hole; 13—Water distribution disc; 131—Shower valve port; 132—Spray gun valve port; 14—Water inlet channel; 15—Shower water channel; 151—Showering water channel; 152—Granular water channel; 153—Pressurized water channel; 16—Spray gun water channel; 17—Shower water outlet; 171—Showering water outlet; 172—Granular water outlet; 173—Pressurized water outlet; 18—Spray gun water outlet;

20—Shower valve core; 21—Limiting portion; 22—Pushing portion on a shower valve core; 23—First sealing member; 24—Second sealing member; 201—Outer end of the shower valve core; 202—Inner end of the shower valve core;

30—Spray gun valve core; 31—Pushing portion on a spray gun valve core; 32—Third sealing member; 33—Fourth sealing member; 301—Outer end of the spray gun valve core; 302—Inner end of the spray gun valve core;

40—Limiting member; 41—Through hole;

50—Reset elastic member;

60—Protrusion; 61—Abutting surface; 62—Limiting step;

70—Spray gun button;

80—Shower button;

91—Shower valve core reset member; 92—Spray gun valve core reset member.

DETAILED DESCRIPTION OF THE EMBODIMENTS

To make the to-be-resolved technical problems, technical solutions and beneficial effects of the present disclosure clearer, the present disclosure is described in further detail below with reference to the accompanying drawings and embodiments. It should be understood that specific embodiments described herein are merely intended to explain the present disclosure, but are not intended to limit the present disclosure.

In the following discussion, details are given to provide a more thorough understanding of the present disclosure. However, those skilled in the art can understand that the present disclosure can be implemented without one or more of these details. In a specific example, in order to avoid confusion with the present disclosure, some technical features well known in the art are not described in detail. It should be noted that the terms "upper", "lower", "front", "rear", "left" and "right" and similar expressions used herein are only for the purpose of illustration, rather than limitation.

Ordinal numerals such as "first" and "second" referred to in the present disclosure are only signs, and do not have any other meanings, such as a specific order. Moreover, for example, the term "first component" itself does not imply the existence of "second component", and the term "second component" itself does not imply the existence of "first component".

Referring to FIGS. 1 to 15, a spray gun shower according to a preferred embodiment of the present disclosure includes:

shower body 10 provided with water inlet channel 14, a plurality of shower water channels 15, spray gun water channel 16, a plurality of shower water outlets 17 in one-to-one communication with the shower water channels 15, and spray gun water outlet 18 in communication with the spray gun water channel 16;

a plurality of shower valve cores 20 movably arranged on the shower body 10, where each shower valve core 20 is configured to control the connection or disconnection between the water inlet channel 14 and the corresponding shower water channel 15, and each shower valve core 20 is provided with limiting portion 21;

spray gun valve core 30 movably arranged on the shower body 10, where the spray gun valve core 30 is configured to control the connection or disconnection between the water inlet channel 14 and the spray gun water channel 16;

limiting member 40 arranged in the shower body 10 and movable between a limiting position and an avoidance position, where the limiting member 40 is configured to be in limiting fit with the limiting portion 21 on the shower valve core 20 when located at the limiting position, the limiting member 40 is configured to avoid the limiting portion 21 on the shower valve core 20 when located at the avoidance position, and the shower valve core 20 and the spray gun valve core 30 each are provided with a pushing portion configured to push the limiting member 40 to move from the limiting position to the avoidance position; and reset elastic member 50 arranged in the shower body 10 and configured to apply an elastic force on the limiting member 40 to move from the avoidance position to the limiting position.

When the shower valve core 20 is driven, the pushing portion 22 on the shower valve core 20 drives the limiting member 40 to move from the limiting position to the avoidance position, and after the pushing portion 22 on the shower valve core 20 moves beyond the limiting member 40, the limiting member 40 is reset to the limiting position under the action of the reset elastic member 50, and then is in limiting fit with the limiting portion 21 on the shower valve core 20, so that the shower valve core 20 is limited at a position at which the corresponding shower water channel 15 communicates with the water inlet channel 14; and when the spray gun valve core 30 is driven, the water inlet channel 14 communicates with the spray gun water channel 16, and the pushing portion 31 on the spray gun valve core 30 drives the limiting member 40 to move from the limiting position to the avoidance position.

With the above arrangement, on one hand, the structure is simpler and more compact on the basis of achieving press switching between water outflow from the plurality of shower water outlets 17; on the other hand, the spray gun valve core 30 used as a reset member cannot be limited by the limiting member 40, so that when the spray gun valve core 30 is pressed, the shower water outlets 17 all stop water outflow, and the spray gun water outlet 18 is controlled for water outflow; and after an external force applied to the spray gun valve core 30 is removed, the spray gun valve core 30 controls stop of outflow of spray gun water. This skillfully combines the water outlet method of "making water flow out whenever pressing and making no water flow out in the case of no pressing" during use of the spray gun water and the function of a "reset button" in the prior art, so that the use experience is better without separately arranging the "reset button", and the structure is simpler and more compact.

Specifically, in this embodiment, there are three shower water channels 15, that is, showering water channel 151, granular water channel 152, and pressurized water channel 153. Correspondingly, there are three shower water outlets 17, that is, showering water outlet 171, granular water outlet 172, and pressurized water outlet 173. Of course, besides showering water, granular water and pressurized water, shower water may also be sheet-shaped water, mist water, and the like, and is not limited thereto. Shower water that is specifically achieved may be selected according to needs, and the shower water can be achieved by using the existing known technology.

In this embodiment, the limiting member 40 is a limiting plate, the limiting plate is slidably arranged in the shower body 10, and the limiting plate is provided with a plurality of through holes 41; the shower valve cores 20 and the spray gun valve core 30 each have a shaft-shaped structure; each of the shower valve cores 20 and the spray gun valve core 30 are slidably arranged on the shower body 10 in an axial direction of the through hole 41, and protrusions 60 are provided on peripheral walls of the shower valve core 20 and the spray gun valve core 30; the protrusions 60 each are provided with abutting surface 61 for forming the pushing portion, the abutting surface 61 matches an inner wall of the through hole 41, and at least one of the abutting surface 61 and the inner wall of the through hole 41 is an inclined surface (herein, both the abutting surface 61 and the inner wall of the through hole 41 are inclined surfaces); the protrusion 60 of the shower valve core 20 is further provided with limiting step 62 for forming the limiting portion 21; after the abutting surface 61 of the protrusion 60 of the shower valve core 20 moves beyond the through hole 41, the limiting member 40 is reset from the avoidance position to the limiting position, and the limiting step 62 is clamped at an edge of the through hole 41.

In this embodiment, the limiting member 40 is arranged in the water inlet channel 14, the shower body 10 is internally provided with water distribution disc 13, and the water distribution disc 13 is provided with a plurality of shower valve ports 131 and spray gun valve port 132; through each shower valve port 131, the water inlet channel 14 communicates with the corresponding shower water channel 15, and the water inlet channel 14 communicates with the spray gun water channel 16 through the spray gun valve port 132; the shower valve core 20 slidably penetrates the shower valve port 131 to open or close the shower valve port 131, and the spray gun valve core 30 slidably penetrates the spray gun valve port 132 to open or close the spray gun valve port 132.

In this embodiment, inner ends 202 of the shower valve cores 20 are provided with the protrusions 60, respectively, and outer ends 201, 301 of the shower valve core 20 and the spray gun valve core 30 hermetically penetrate out of the shower body 10.

Specifically, in this embodiment, handle 12 of the shower body 10 is provided with first punched hole 121 for the shower valve core 20 to pass through and second punched hole 122 for the spray gun valve core 30 to pass through; the shower valve core 20 is provided with first sealing member 23 for sealing the shower valve port 131 and second sealing member 24 for sealing the first punched hole 121; and the spray gun valve core 30 is provided with third sealing member 32 for sealing the spray gun valve port 132 and fourth sealing member 33 for sealing the second punched hole 122. The first sealing member 23, the second sealing member 24, the third sealing member 32 and the fourth sealing member 33 are sealing rings.

In this embodiment, the shower body 10 includes shower head 11 and the handle 12, the limiting member 40 is arranged in the handle 12 and slides in an axial direction of the handle 12, the plurality of shower valve cores 20 are arranged on the handle 12 side by side in the axial direction of the handle 12, and the shower valve cores 20 are spaced. In this embodiment, the shower valve core 20 and the spray gun valve core 30 each have a shaft-shaped structure, and the shower valve core 20 and the spray gun valve core 30 are slidably arranged on the shower body 10 in a radial direction of the handle 12.

In this embodiment, the spray gun shower further includes spray gun button 70 and a plurality of shower buttons 80 movably arranged on the handle 12, where the spray gun button 70 is in linkage fit with the spray gun valve core 30, and the shower buttons 80 are in one-to-one linkage fit with the shower valve cores 20; the shower head 11 includes water outlet panel 111 provided with the shower water outlets 17, the shower buttons 80 and the water outlet panel 111 are on the same side of the shower body 10, the spray gun button 70 and the water outlet panel 111 are on different sides of the shower body 10, and a direction in which the spray gun button 70 is pressed is opposite to a direction in which the shower buttons 80 are pressed.

In this embodiment, the reset elastic member 50 is a compression spring, one end of the compression spring abuts against an inner wall of the shower body 10, and the other end of the compression spring abuts against an end of the limiting member 40.

In this embodiment, the shower body 10 is internally further provided with shower valve core reset member 91 and spray gun valve core reset member 92; when the limiting member 40 releases a limitation on the shower valve core 20, the shower valve core reset member 91 drives the shower valve core 20 to reset; and after an external force applied to the spray gun valve core 30 is removed, the spray gun valve core 30 is reset under the action of the spray gun valve core reset member 92.

Figure 11:
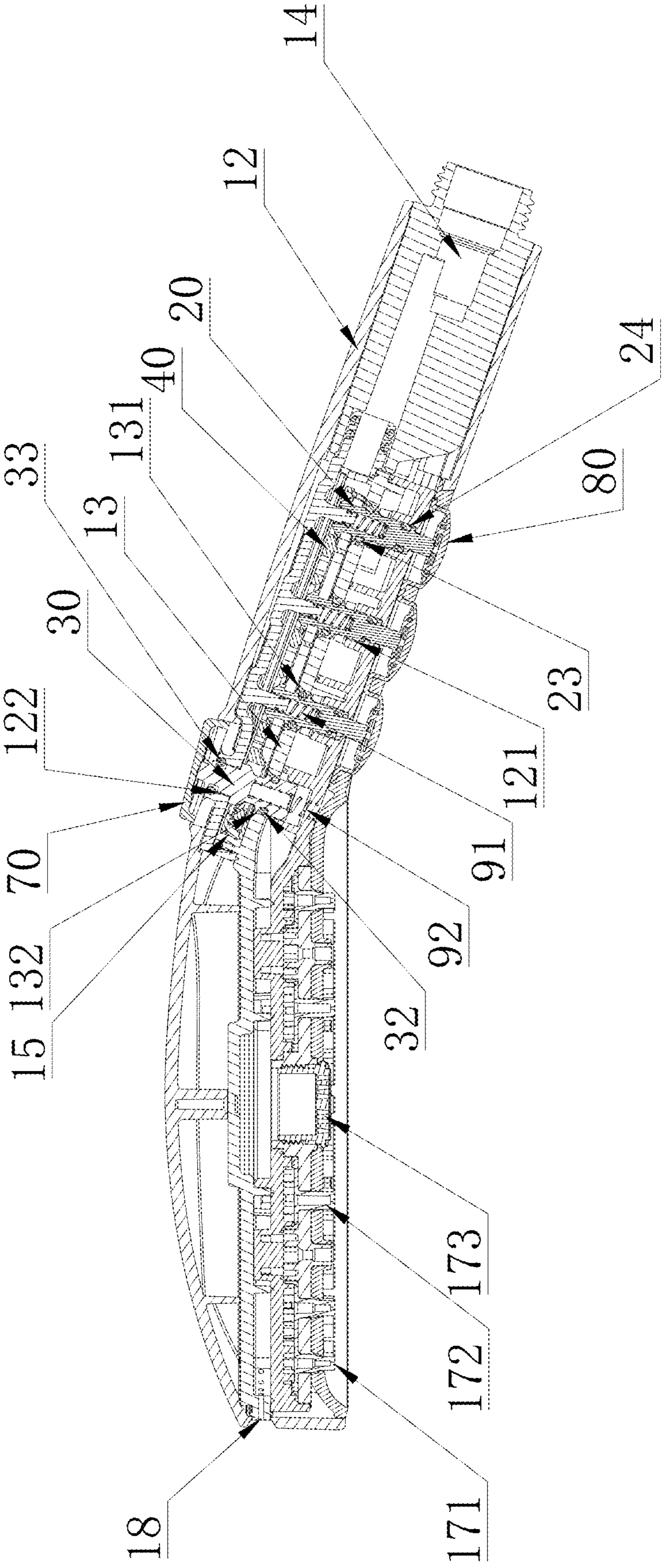
FIG. 11 is a sectional view of a spray gun shower in an initial state (no water outflow) according to an embodiment of the present disclosure.

The specific operation process of this embodiment is briefly described as follows:

Referring to FIG. 11, an initial state is provided, all water outlets stop water outflow, and the shower valve core 20 closes the shower valve port 131, thereby cutting off communication between the water inlet channel 14 and each shower water channel 15.

Figure 12:
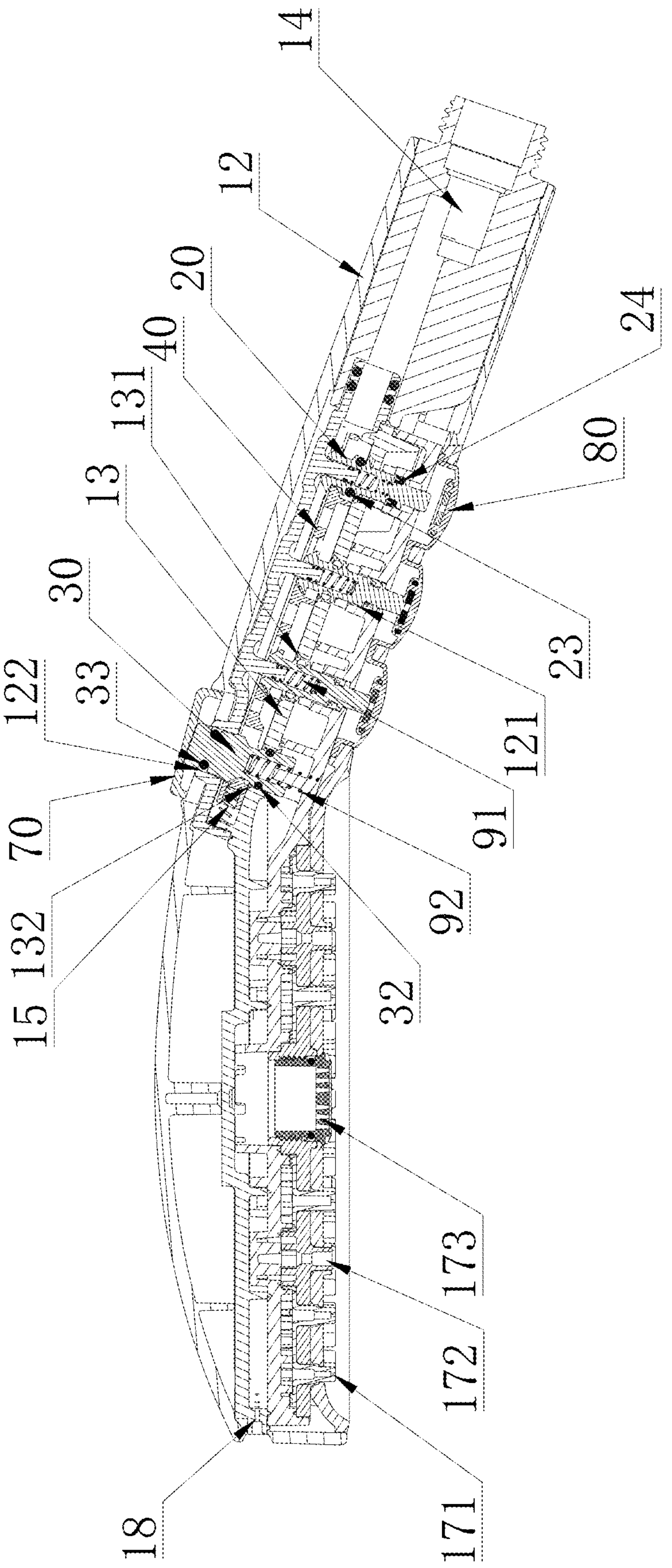
FIG. 12 is a sectional view of a spray gun shower in a showering water outflow state according to an embodiment of the present disclosure.

Referring to FIG. 12, in the state of FIG. 11, the shower button 80 corresponding to the showering water channel 151 is pressed, and the shower button 80 drives the shower valve core 20 to open the shower valve port, so that the water inlet channel 14 communicates with the showering water channel 151, thereby allowing showering water to flow out of the showering water outlet 171; in addition, when the shower valve core 20 is being driven, the pushing portion 22 on the shower valve core 20 drives the limiting member 40 to move from the limiting position to the avoidance position, and after the pushing portion 22 on the shower valve core 20 moves beyond the limiting member 40, the limiting member 40 is reset to the limiting position under the action of the reset elastic member 50, and then is in limiting fit with the limiting portion 21 on the shower valve core 20, so that the shower valve core 20 is limited at a position at which the showering water channel 151 communicates with the water inlet channel 14.

Figure 13:
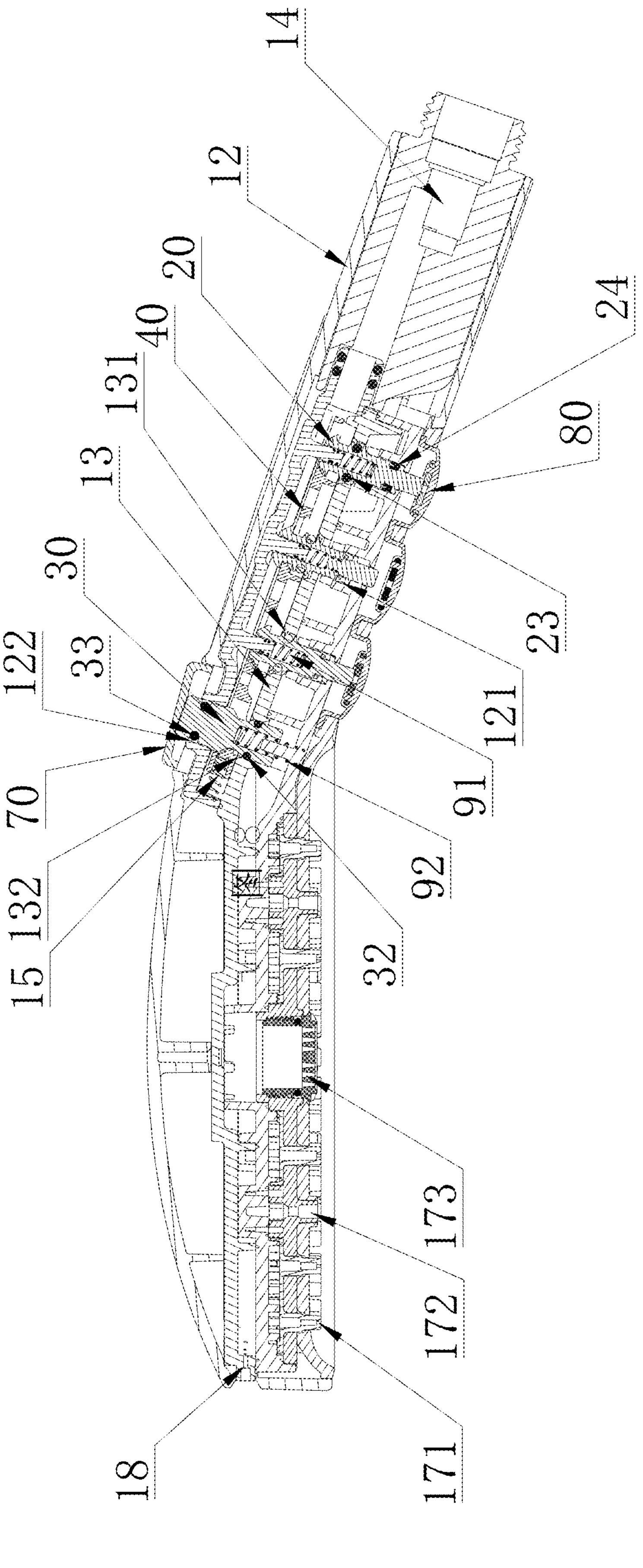
FIG. 13 is a sectional view of a spray gun shower in a granular water outflow state according to an embodiment of the present disclosure.

Referring to FIG. 13, in the state of FIG. 12, the shower button 80 corresponding to the granular water channel 152 is pressed, and the shower button 80 drives the shower valve core 20 to open the shower valve port, so that the water inlet channel 14 communicates with the granular water channel 152, thereby allowing granular water to flow out of the granular water outlet 172; in addition, when the shower valve core 20 is being driven, the pushing portion 22 on the shower valve core 20 drives the limiting member 40 to move from the limiting position to the avoidance position (in this case, the limiting member 40 releases the shower valve core 20 corresponding to the showering water channel 151, so that the showering water channel 151 is cut off from the water inlet channel 14), and after the pushing portion 22 on the shower valve core 20 moves beyond the limiting member 40, the limiting member 40 is reset to the limiting position under the action of the reset elastic member 50, and then is in limiting fit with the limiting portion 21 on the shower valve core 20, so that the shower valve core 20 is limited at a position at which the granular water channel 152 communicates with the water inlet channel 14.

Figure 14:
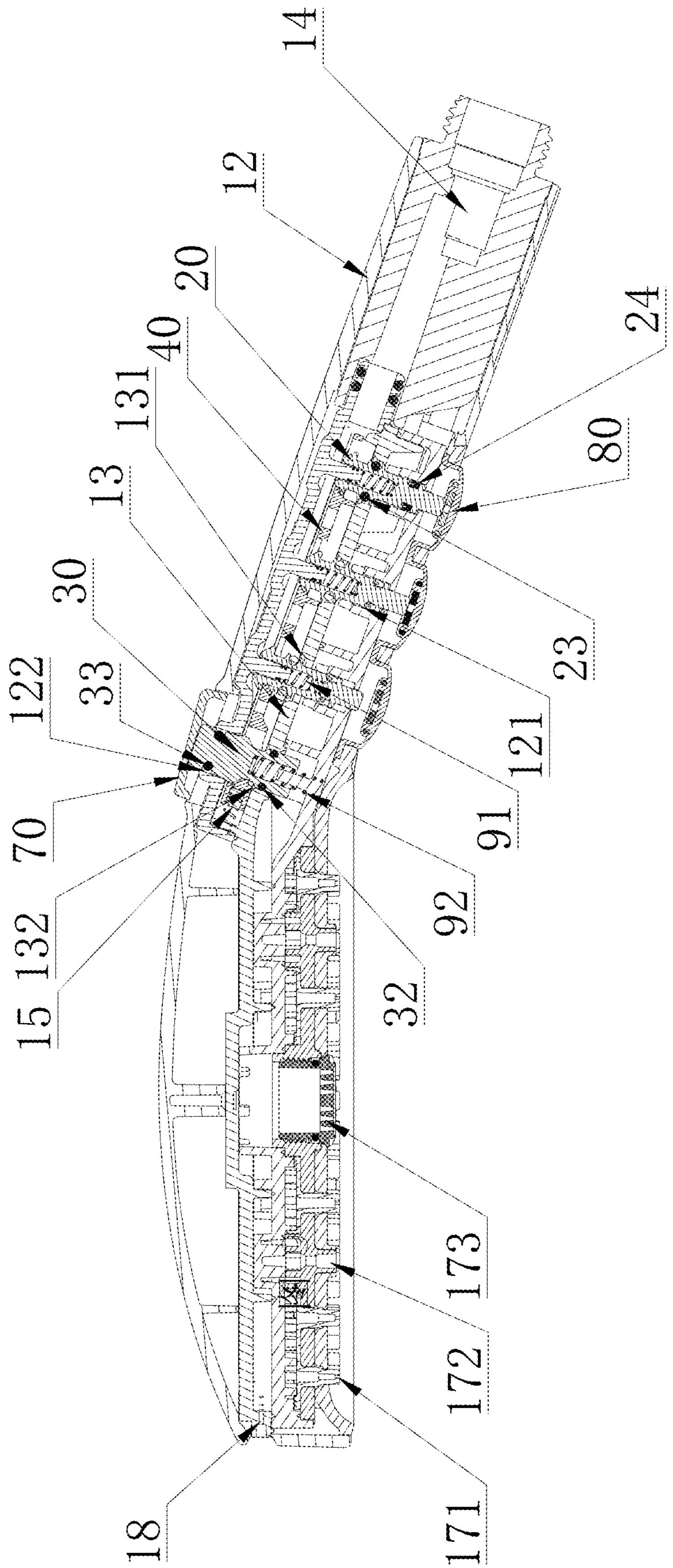
FIG. 14 is a sectional view of a spray gun shower in a pressurized water outflow state according to an embodiment of the present disclosure.

Referring to FIG. 14, in the state of FIG. 13, the shower button 80 corresponding to the pressurized water channel 153 is pressed, and the shower button 80 drives the shower valve core 20 to open the shower valve port, so that the water inlet channel 14 communicates with the pressurized water channel 153, thereby allowing pressurized water with a higher pressure to flow out of the pressurized water outlet 173; in addition, when the shower valve core 20 is being driven, the pushing portion 22 on the shower valve core 20 drives the limiting member 40 to move from the limiting position to the avoidance position (in this case, the limiting member 40 releases the shower valve core 20 corresponding to the granular water channel 152, so that the granular water channel 152 is cut off from the water inlet channel 14), and after the pushing portion 22 on the shower valve core 20 moves beyond the limiting member 40, the limiting member 40 is reset to the limiting position under the action of the reset elastic member 50, and then is in limiting fit with the limiting portion 21 on the shower valve core 20, so that the shower valve core 20 is limited at a position at which the pressurized water channel 153 communicates with the water inlet channel 14.

Figure 15:
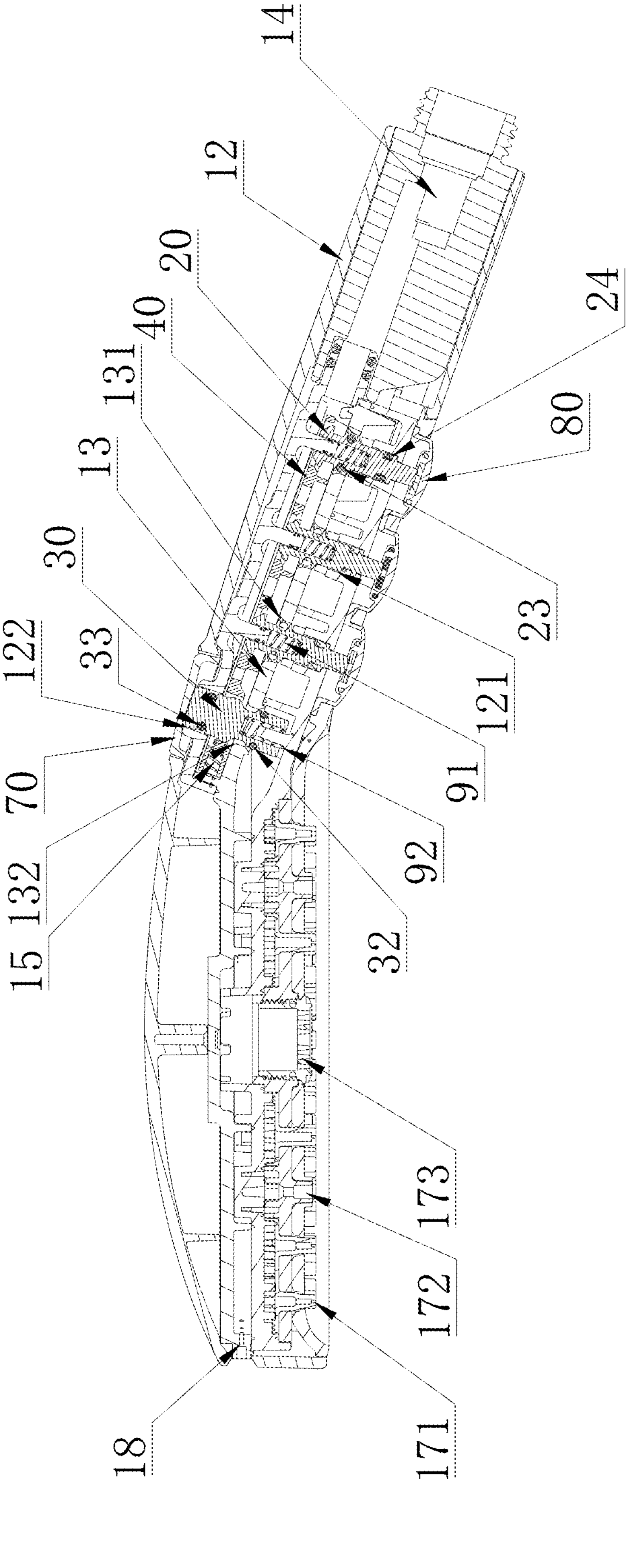
FIG. 15 is a sectional view of a spray gun shower in a spray gun water outflow state according to an embodiment of the present disclosure.

Referring to FIG. 15, in the state of FIG. 12, 13 or 14, the spray gun button 70 is pressed, and the spray gun button 70 drives the spray gun valve core 30, so that the water inlet channel 14 communicates with the spray gun water channel 16, thereby allowing water to flow out of the spray gun water outlet; in addition, the pushing portion 31 on the spray gun valve core 30 drives the limiting member 40 to move from the limiting position to the avoidance position, so that each shower valve core 20 is reset to close each shower valve port 131, and outflow of all shower water is stopped. If the spray gun button 70 is pressed continuously, water continuously flows out of the spray gun water outlet 18. If an external force applied to the spray gun button 70 is removed, the spray gun valve core 30 is reset under the action of the spray gun valve core reset member 92, so that the spray gun water outlet 18 stops water outflow.

Of course, when in use, two of the three shower buttons 80 may alternatively be pressed simultaneously to allow water to flow out of the corresponding shower water outlets 17, or all three shower buttons 80 may be pressed to allow water to flow out of all the shower water outlets 17.

Unless otherwise defined, the technical and scientific terms used herein have the same meanings as those commonly understood by those skilled in the technical field of the present disclosure. The terms used herein are merely intended to describe the specific implementations, rather than to limit the present disclosure. Terms such as "component" used herein may indicate a single part or a combination of a plurality of parts. Terms such as "mount" and "arrange" used herein may mean that one component is directly attached to another component, or that one component is attached to another component by an intermediate member. A feature described in one implementation herein can be applied to another implementation alone or in combination with other features, unless the feature is not applicable in the another implementation or otherwise specified.

The preferred embodiments of the present disclosure are shown and described above. But as mentioned above, it should be understood that the present disclosure is not limited to the form disclosed herein, and should not be regarded as an exclusion of other embodiments. The present disclosure can apply to various combinations, modifications and scenarios in other forms, and changes can be made by means of the above teachings and technologies or knowledge in the related fields within the scope of conception of the present disclosure described herein. Changes and variations made by those skilled in the art without departing from the spirit and scope of the present disclosure should fall within the protection scope of the appended claims of the present disclosure.

What is claimed is:

1. A spray gun shower, comprising:

a shower body provided with a water inlet channel, a plurality of shower water channels, a spray gun water channel, a plurality of shower water outlets in one-to-one communication with the plurality of shower water channels, and a spray gun water outlet in communication with the spray gun water channel;

a plurality of shower valve cores movably arranged in the shower body, wherein each of the plurality of shower valve cores is configured to control connection or disconnection between the water inlet channel and a respective shower water channel of the plurality of shower water channels, and each of the plurality of shower valve cores is provided with a limiting portion and a pushing portion;

a spray gun valve core movably arranged in the shower body, wherein the spray gun valve core is configured to control connection or disconnection between the water inlet channel and the spray gun water channel, and the spray gun valve core is provided with a pushing portion;

a limiting member arranged in the shower body and movable between a limiting position with respect to a respective shower valve core of the plurality of shower valve cores and an avoidance position with respect to the respective shower valve core of the plurality of shower valve cores, wherein when the limiting member is moved to the limiting position with respect to the respective shower valve core of the plurality of shower valve cores, the limiting member is configured to be in limiting fit with the limiting portion of the respective shower valve core of the plurality of shower valve cores, and when the limiting member is moved to the avoidance position with respect to the respective shower valve core of the plurality of shower valve cores, the limiting member is configured to avoid the limiting portion of the respective shower valve core of the plurality of shower valve cores; and a reset elastic member arranged in the shower body and configured to apply an elastic force to the limiting member to cause the limiting member to move from the avoidance position with respect to the respective shower valve core of the plurality of shower valve cores to the limiting position with respect to the respective shower valve core of the plurality of shower valve cores, wherein when a first shower valve core of the plurality of shower valve cores is driven, the pushing portion of the first shower valve core pushes the limiting member to move from the limiting position with respect to a second shower valve core of the plurality of shower valve cores to the avoidance position with respect to the second shower valve core of the plurality of shower valve cores, and after the pushing portion of the first shower valve core moves beyond the limiting member, the limiting member is reset under an action of the reset elastic member and to move from the avoidance position with respect to the first shower valve core to the limiting position with respect to the first shower valve core where the limiting member is in the limiting fit with the limiting portion on the first shower valve core, such that a first shower water channel of the plurality of shower water channels is connected to the water inlet channel;

when the spray gun valve core is driven, the pushing portion of the spray gun valve core pushes the limiting member to move from at least one limiting position of the limiting positions corresponding to at least one shower valve core of the plurality of shower valve cores to at least one avoidance position of the avoidance positions corresponding to the at least one shower valve core of the plurality of shower valve cores, wherein, when the limiting member is moved to the avoidance positions corresponding to all of the shower valve cores of the plurality of shower valve cores, the limiting member avoids the limiting portions of all of the shower valve cores of the plurality of shower valve cores, such that the water inlet channel is disconnected from all of the shower water channels of the plurality of shower water channels and is connected to the spray gun water channel;

wherein the shower body comprises a shower head and a handle, the limiting member is arranged in the handle and slides in an axial direction of the handle, the plurality of shower valve cores are spaced on the handle side by side in the axial direction of the handle;

wherein the spray gun shower further comprises a spray gun button and a plurality of shower buttons movably arranged on the handle, the spray gun button is in linkage fit with the spray gun valve core, and the plurality of shower buttons are in one-to-one linkage fit with the plurality of shower valve cores; and wherein the shower head comprises a water outlet panel provided with the plurality of shower water outlets, the plurality of shower buttons and the water outlet panel are located on the same side relative to the handle and face to a same direction, the spray gun button and the water outlet panel are located on opposite sides relative to the handle and face to opposite directions, and a direction where the spray gun button is pressed is opposite to a direction where at least one shower button of the plurality of shower buttons is pressed.

2. The spray gun shower according to claim 1, wherein the limiting member is a limiting plate provided with a plurality of through holes;

the spray gun valve core comprising a shaft-shaped structure and a protrusion provided on a peripheral wall of the shaft-shaped structure, and the protrusion comprising an abutting surface that forms the pushing portion of the spray gun valve core;

each of the plurality of shower valve cores respectively comprising a shaft-shaped structure and a protrusion provided on a peripheral wall of the shaft-shaped structure, and the protrusion of each of the plurality of shower valve cores comprising an abutting surface that forms the pushing portion of each of the plurality of shower valve cores;

the spray gun valve core and each of the plurality of shower valve cores are respectively arranged in the handle and are respectively slidable in a respective axial direction of a respective through hole of the plurality of through holes;

the abutting surface of at least one valve core of the spray gun valve core and the plurality of shower valve cores matching an inner wall of the respective through hole of the plurality of through holes, wherein the abutting surface of the at least one valve core of the spray gun valve core and the plurality of shower valve cores and/or the inner wall of the respective through hole is an inclined surface;

the protrusion of each of the plurality of shower valve cores is further provided with a limiting step for forming the limiting portion of each of the plurality of shower valve cores; and after the abutting surface of the protrusion that forms the pushing portion of the first shower valve core of the plurality of shower valve cores moves beyond the respective through hole of the plurality of through holes of the limiting member, the limiting member is reset under the action of the reset elastic member and to move from the avoidance position with respect to the first shower valve core to the limiting position with respect to the first shower valve core where the limiting step that forms the limiting portion of the first shower valve core is clamped at an edge of the respective through hole.

3. The spray gun shower according to claim 2, wherein the limiting member is arranged in the water inlet channel, and a plurality of shower valve ports and a spray gun valve port are provided in the handle;

the water inlet channel communicates with the respective shower water channel of the plurality of shower water channels through a respective shower valve port of the plurality of shower valve ports, and the water inlet channel communicates with the spray gun water channel through the spray gun valve port; and each of the plurality of shower valve cores slidably penetrates the respective shower valve port of the plurality of shower valve ports to open or close the respective shower valve port, and the spray gun valve core slidably penetrates the spray gun valve port to open or close the spray gun valve port.

4. The spray gun shower according to claim 3, wherein each of the plurality of shower valve cores respectively comprising an outer end and an inner end provided with the protrusion, the spray gun valve core comprising an outer end, and all of the outer end of the plurality of shower valve cores and the spray gun valve core hermetically penetrate out of the handle.

5. The spray gun shower according to claim 3, wherein the handle is provided with a plurality of first punched holes and a second punched hole, a respective first punched hole of the plurality of first punched holes being configured for the respective shower valve core of the plurality of shower valve cores to pass through, and the second punched hole being configured for the spray gun valve core to pass through;

each of the plurality of shower valve cores is provided with a first sealing member for sealing the respective shower valve port of the plurality of shower valve ports and a second sealing member for sealing the respective first punched hole of the plurality of first punched holes; and the spray gun valve core is provided with a third sealing member for sealing the spray gun valve port and a fourth sealing member for sealing the second punched hole.

6. The spray gun shower according to claim 1, wherein each of the plurality of shower valve cores respectively comprising a shaft-shaped structure, the spray gun valve core comprising a shaft-shaped structure, and each valve core of the spray gun valve core and the plurality of shower valve cores is respectively slidably arranged in the handle in a respective radial direction of the handle.

7. The spray gun shower according to claim 1, wherein the reset elastic member is a compression spring, a first end of the compression spring abuts against an inner wall of the shower body, and a second end of the compression spring abuts against an end of the limiting member.

8. The spray gun shower according to claim 1, wherein the shower body is internally further provided with a plurality of shower valve core reset members and a spray gun valve core reset member;

when the limiting member releases the limiting portion of the respective shower valve core of the plurality of shower valve cores, a respective shower valve core reset member of the plurality of shower valve core reset members drives the respective shower valve core to reset; and after an external force applied to the spray gun valve core is removed, the spray gun valve core is reset under an action of the spray gun valve core reset member.

* * * * *